3,425,702
DEVICE FOR GUIDING A DISK IN A JUKEBOX
Katsuhiro Kawasaki, Yokohama, Japan, assignor to Victor Company of Japan, Limited, Yokohama, Japan
Filed July 3, 1967, Ser. No. 650,830
Claims priority, application Japan, July 7, 1966, 41/63,601
U.S. Cl. 274—10 7 Claims
Int. Cl. G11b *17/04, 17/22*

ABSTRACT OF THE DISCLOSURE

An element for guiding a phonograph disk which is to be positioned vertically against a turntable, the guide element including a stationary element which extends transversely to the turntable axis and includes respective first and second extents which are inclined towards the plane of the turntable face, the first and second extents being arranged to successively engage a disk which is advanced in a direction transverse to the turntable axis, said extents guiding the disk to successively closer axial positions relative to said turntable face.

*Disclosure*

This invention relates to a device for guiding a disk, and more particularly to a device for setting or guiding a selected disk or phonograph record in a jukebox.

An object of this invention is to provide an improved device for guiding a disk in a jukebox which is simple and economical in construction as compared to prior types of guiding devices.

Another object of this invention is to provide a disk guiding device which does not cause the disk to become jammed between the turntable and the pressure element while the disk is being set in place on the turntable.

A further object is to provide a disk guiding device which functions to position the disk just adjacent to the turntable with no inclination relative thereto when the disk has completed its movement to a position between the turntable and pressure element so that a central protrusion of the element can be inserted into the central opening of the disk.

A further object is to provide a disk guiding device, for disks which are played in vertical position, which prevents the disk from dropping while it is being set.

The invention comprises a disk guiding device for use in disk (phonograph record) players, such as jukeboxes, wherein the disk is played in a vertical position (i.e., about a horizontal axis), and wherein the player comprises a conventional disk magazine, a disk transfer mechanism, a vertical turntable, and a rotatable pressure element which is displaceable axially towards and away from said turntable for pressing the disk thereagainst. The disk guiding device itself is characterized in that it consists of a stationary member extending between the turntable and pressure element at a distance from the turntable which distance is smaller at one end of the guide member which is free than at an opposite end which is fixed, the disk being transferred from the disk magazine to a position adjacent the turntable in a direction from said fixed end towards said free end.

Other objects and features of this invention will be apparent from the following detailed description taken in conjunction with the accompanying drawings, in which;

FIGS. 7 to 13 are schematic plan views of the second to eighth embodiments of guide devices according to this invention;

FIGS. 7A to 13A are front views of the devices of FIGS. 7 to 13; and

FIGS. 7B to 13B and 7C to 9C are schematic front views of modified versions of the devices shown in FIGURES 7 to 13 embodiments of this invention.

Figure 1:
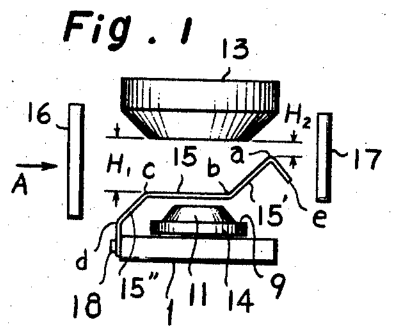
FIGURE 1 is a top plan view of a player incorporating a first embodiment of the guide device of this invention.

In describing preferred embodiments of the invention which are illustrated in the drawings, specific terminology will be restored to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawings, a number 13 designates generally a turntable for rotating a disk or record 12 thereon. A pressure element 14 for pressing the disk 12 to the turntable 13 is supported rotatably and axially freely slidable in an axial hole 2 provided on a player body 1, and it may be advanced toward the turntable 13 by a device (not shown in the drawings). At the center of the pressure element 14, there is provided a cone-shaped protrusion 11 engageable into a central hole of the annular disk 12 and peripherally surrounding said protrusion 11 there is provided a radial shoulder or flange 9 for engaging the disk surface surrounding the central hole therein.

A stationary guide 15 in the form of wire or bar is fixed to the player body 1 by screws 18. It is preferable that the guide 15 be positioned between the turntable 13 and pressure element 14 slightly displaced from the centers thereof as shown in FIGS. 3 to 6, according to results obtained through experiments.

Figure 2:
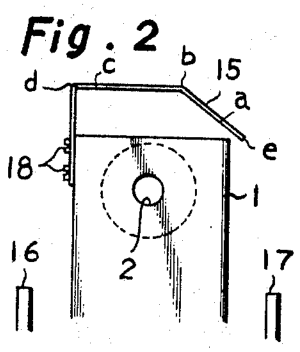
FIG. 2 is a front view of the device of FIG. 1.

As is seen in FIGURE 1, the guide member 15 extends from its fixed end at 18 in a direction transverse to the rotary axes of turntable 13 and pressure element 11 to terminate in a free end portion *b–a–e* located opposite to the fixed end. According to the first embodiment shown in FIGURES 1 and 2, the guide member 15 includes a main leg *c–b* which extends generally parallel to the turntable face at a distance $H_1$ therefrom, said main leg being connected to the fixed end portion of member 15 by a first inclined leg 15″ which extends away from the turntable face, and said main leg at its opposite end being joined to a second inclined leg 15′ which extends towards the turntable. The inclination of first leg 15″ acts as a funnel to assist in initially guiding the disk to its proper position adjacent to the turntable face.

The free end portion *b–a–e* of guide member 15 is bent into a V-shaped form with the apex point *a* being spaced from the turntable face a distance $H_2$ which is considerably smaller than distance $H_1$.

FIGS. 3 to 6 are schematic views showing the various stages during operation of a player employing a guide member according to this invention, the player including an L-shaped disk setting lever 10 for transferring the disk 12 from a disk magazine (not shown) to said turntable 13.

Figure 3:
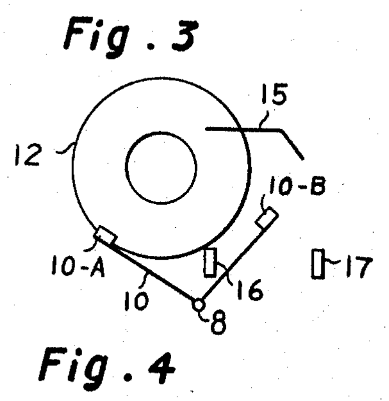
FIGS. 3 to 6 are schematic front views illustrating various stages during the operation of a player which incorporates a guide device according to this invention.

The operation of this apparatus will be explained below. Lever 10 pivots about means 8 from its counterclockwise position of FIGURE 3 in a clockwise direction successively through the stages depicted in FIGURES 4 to 6. In the FIGURE 3 position, the front arm 10–A of lever 10 has already engaged disk 12 along a peripheral edge thereof while said disk was in the not shown disk magazine and transferred said disk in a direction transverse to the turntable axis (see arrow A in FIGURE 1) until an edge portion of said disk has engaged the surface of front bar 16. As is seen in FIGURES 2 to 6, a front bar 16 and a corresponding back bar 17 are positioned below and on opposite diametrical sides of the turntable. As is seen in FIGURE 3, the upper right hand edge portion of disk 12 has already reached a position along main leg *b–c* of guide member 15 in the axial space between member 15 and the turntable face. Distance $H_1$ is large enough to permit easy movement of the disk along leg *b–c* of the guide member.

Figure 6:
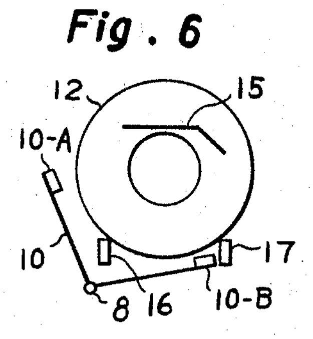

As disk 12 is pushed over front bar 16 (FIGURE 4) by lever 10, said disk begins to roll by itself (FIGURE 5) until it comes to rest cradled between front and back bars 16 and 17 (FIGURE 6).

Figure 4:
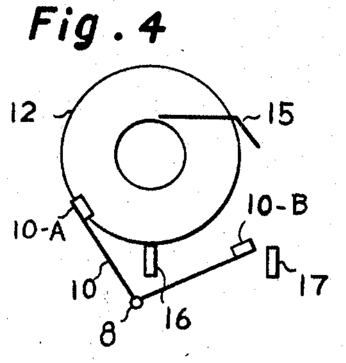
Figure 5:
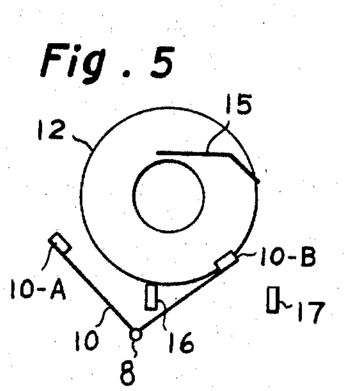

In rolling from its position as shown in FIGURE 4 to its final at-rest position (FIGURE 6), disk 12 engages a back arm 10–B of lever 19 (FIGURE 5) and thereby swings lever 10 about pivot means 8 clockwise to the position shown in FIGURE 6. Further, in rolling from its FIGURE 4 position, disk 12 slides along the second inclinded leg 15' of guide member 15 and thereby said disk is pushed axially towards the turntable 13 a distance corresponding to the axial width of portion *b–a*.

When the pressure element 14 is advanced toward the turntable 13, the cone-shaped protrusion 11 of the pressure element 14 is easily inserted into the central hole of the disk 12 and the disk 12 is pressed onto the turntable 13.

Because the disk 12 is supported by the front bar 16 and back bar 17 in a position whereby the center of the disk 12 is slightly lower than that of the turntable 13, the cone-shaped protrusion 11 acts to lift the disk off said bars 16 and 17 as the pressure element 14 advances axially towards the turntable thereby coaxially aligning the disk with the turntable. The disk can be freely rotated once it is held by said element 14 against the turntable.

The aforedescribed guide member 15 is highly advantageous since it guides the disk to a position very close to the turntable. Further, by virtue of the guide member 15 being closer to the turntable in the vicinity of its free end than it is in the vicinity of its fixed end, there is obviated the circumstance of the disk becoming caught or jammed between the turntable and pressure element while the disk is being set into position. Also, since the disk is positioned by apex *a* of the guide member 15 very close to the turntable and in a vertical position without any inclination relative to said table, the cone-shaped protrusion 11 can be gently inserted into the disk center without any danger of the disk falling off said protrusion 11.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention.

FIGS. 7, 7A, 7B, 7C to 13, 13A, 13B show devices of the embodiments incorporating the principles of the invention described hereinabove. Like reference characters designate similar parts in the drawings.

Figures 7, 7A, 7B, 7C, 8, 8A, 8B, 8C, 9, 9A, 9B, 9C:
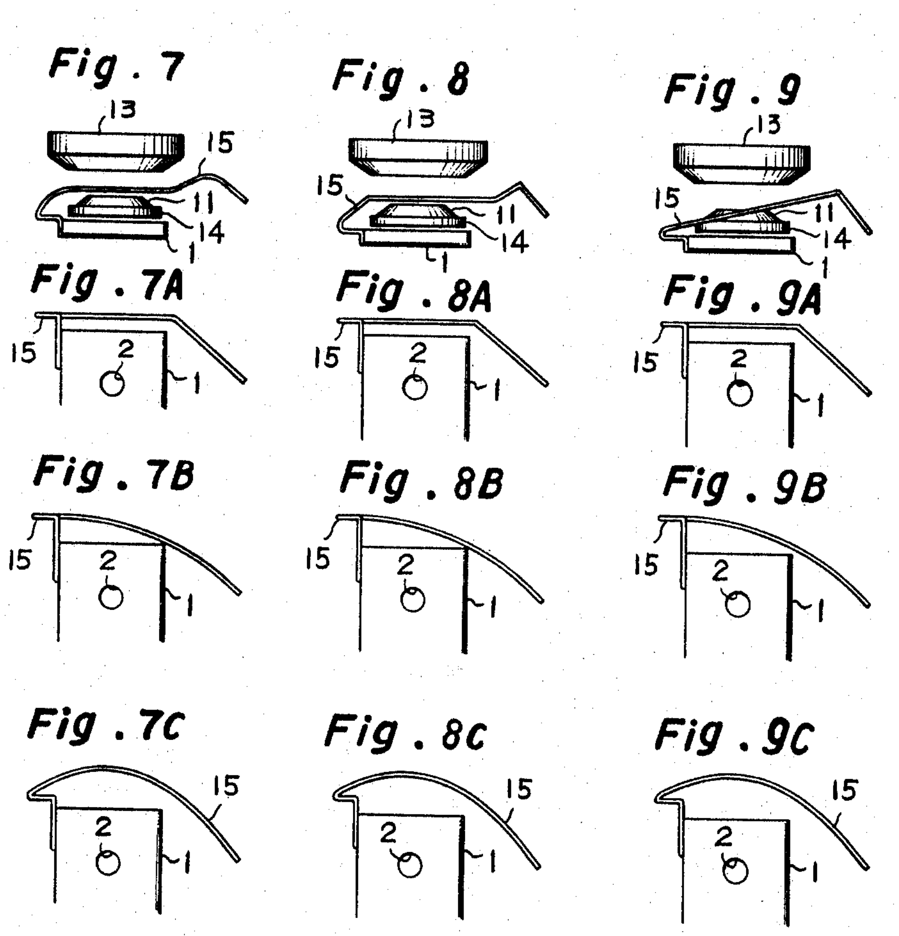

The device shown in FIG. 7 has a guide 15, the back end of which is bended as a V-shaped configuration instead of the V-shaped configuration as the guide shown in FIG. 1. The front end of each guide 15 shown in FIGS. 7 and 8 is beneded as a U-shaped configuration.

The guide of FIG. 9 has an inclined portion positioned between the turntable 13 and the pressure element 14.

Figures 10, 10A, 10B, 11, 11A, 11B, 12, 12A, 12B, 13, 13A, 13B:
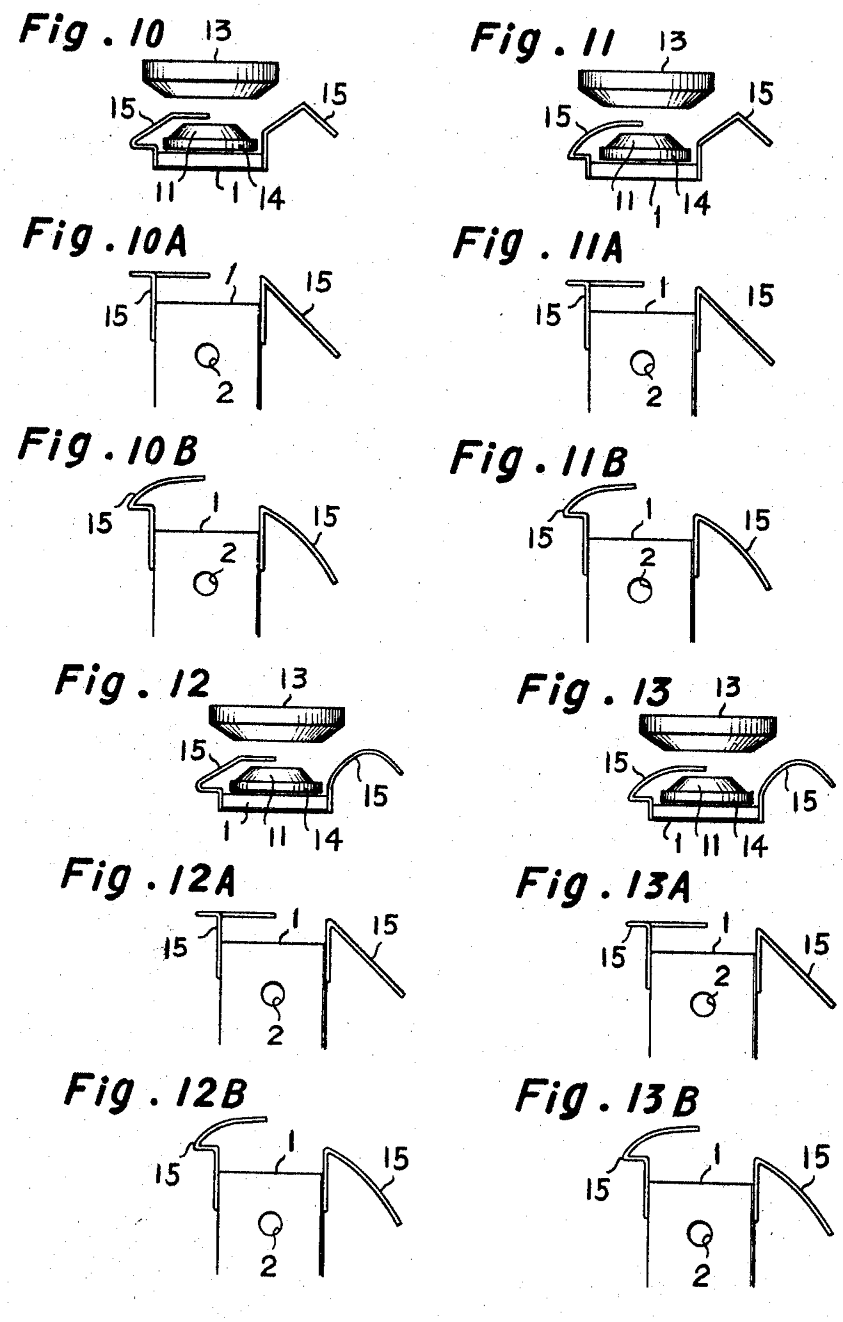

In FIGS. 10 to 12, each guide 15 is separated into two portions, each of which is fixed to the player body 1. The functions and effects of the above each device shown in FIGS. 7 to 13, however, are the same with that of the device shown in FIG. 1, respectively.

What I claim is:

1. A phonograph record player such as a jukebox, wherein a phonograph disk is transferred from a disk magazine to a position parallelly adjacent to a turntable surface and is then pressed axially against said surface, said player comprising a vertically disposed turntable rotatable about a horizontal axis, a pressure element rotatable about a common axis with said turntable and displaceable along said axis in either direction relative to said turntable and adapted to hold a disk against a face of said turntable while the latter is rotating, a stationary guide means for guilding a disk to a position parallelly adjacent to said turntable face and comprising elongate portions extending lengthwise along a space between said turntable and pressure element in a direction transverse to the turntable axis, first and second opposite ones of said portions being respectively positioned along said space on different sides of said common axis, and said first portion being axially spaced apart from the plane of said turntable face and said second portion extending axially closer to said plane than any part of said first portion, both said first and second portions extending in a direction inclined to said common axis and means to advance a disk edgewise into the space between said guide means and turntable beginning at said first portion and towards said second portion.

2. The player of claim 1, said first and second portions each being inclined towards the plane of said turntable face whereby a disk being advanced edgewise into the space between said turntable and said guide means portions is guided progressively axially closer to said turntable face by said portions.

3. The player of claim 1, wherein said guide means is comprised by a one-piece elongate member, one end of which is fixed and is adjacent to said first portion, and the other end of which is freely supported in cantilever fashion from said first end and is adjacent to said second portion.

4. The player of claim 3, wherein said first and second portions are each inclined in the direction of the plane of said turntable face and are interconnected by a main leg which extends generally parallel to said turntable face whereby a disk is first guided by said first portion to an axial position spaced from said turntable face which position corresponds to the position of said main leg, the disk being then guided along said main leg and then to an axial position closer to said turntable face by said second portion.

5. The player of claim 1, wherein said guide means is a one-piece elongate member one end of which is fixed and the other end of which is freely supported in cantilever fashion from said first end, said first and second portions being comprised by a main leg portion extending between said fixed and free ends and being continuously inclined from a point on one side of said turntable axis to a point on the opposite side thereof, the inclination being towards the plane of said turntable.

6. The player of claim 1, wherein said guide means first portion is inclined towards said turntable face and terminates in a free end at a point intermediate the horizontal extent of said turntable, said guide means second portion also being inclined towards the plane of said turntable face but reaching a point closer thereto than said first portion, said second portion being transversely spaced apart from said free end of said first portion.

7. The player of claim 1, including an L-shaped lever for transferring a disk out of a magazine and into the space between said turntable and guide means, a pair of elongate stationary support bars extending horizontally generally parallel to said turntable axis on opposite vertical sides thereof, said lever being pivoted at the juncture of its two legs, a front one of which is adapted to advance a disk from a magazine and over a front one of said bars whereupon the disk may roll on said front bar towards the other bar to an at-rest position supported on both said bars, said bars being positioned below said turntable axis whereby the axis of a disk supported on said bars is substantially aligned with the turntable axis, the legs of said lever being engageable with respective spaced apart edge portions of said disk, said pressure element being adapted to advance axially towards said turntable and to engage a disk which is supported on said bars and correspondingly press same against said turntable face while centering it relative to the turntable axis.

References Cited

UNITED STATES PATENTS

| | | | |
|---|---|---|---|
| 3,034,792 | 5/1962 | Kenney et al. | 274—10 |
| 2,594,633 | 4/1952 | Freimann et al. | 274—39 |

LEONARD FORMAN, *Primary Examiner.*

F. J. D'AMBROSIO, *Assistant Examiner.*